B. W. STOREY.
Bread-Slicers.
No. 157,886.  Patented Dec. 15, 1874.
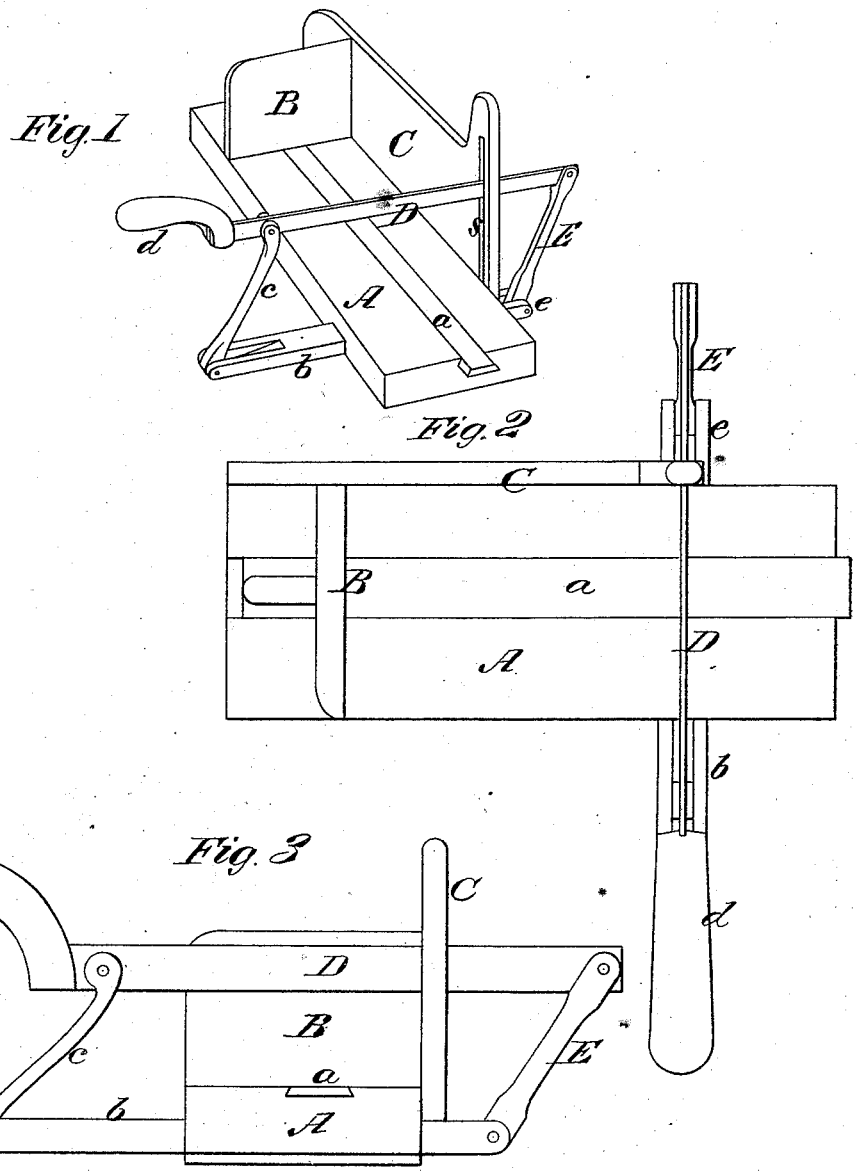
WITNESSES
Mary J. Utty.
E. H. Bates
INVENTOR
Bradford W. Storey
Chipman Hosmer & Co.
Attorneys

UNITED STATES PATENT OFFICE.

BRADFORD W. STOREY, OF SMITHVILLE, NEW JERSEY.

IMPROVEMENT IN BREAD-SLICERS.

Specification forming part of Letters Patent No. 157,886, dated December 15, 1874; application filed August 19, 1874.

*To all whom it may concern:*

Be it known that I, BRADFORD W. STOREY, of Smithville, in the county of Burlington and State of New Jersey, have invented a new and valuable Improvement in Bread-Slicers; and I do hereby declare that the following is a full, clear, and exact description of the construction and operation of the same, reference being had to the annexed drawings making a part of this specification, and to the letters and figures of reference marked thereon.

Figure 1 of the drawing is a representation of a perspective view of my bread-slicer. Fig. 2 is a side view. Fig. 3 is a plan view of the same.

This invention has relation to devices which are designed for slicing bread; and it consists in combining, with a side board fixed upon the platform of a bread-slicer and an adjustable end board rigidly secured to a slide, which is endwise movable in a dovetail of the platform, a vertically-movable cutting-knife, which is pivoted at each end of its cutting-parts to arms of equal length, which vibrate vertically on pivots of the platform, whereby the knife is positively guided in its descent in a horizontal plane, thereby simulating the action of cutting bread by hand, and obtaining a horizontal draw-cut action for the said knife, as will be hereinafter more fully explained.

In the annexed drawings, A designates the bed of the machine, which may be of any desired length and width, and B is a guide-board, which is perpendicular to the bed A, and at right angles to a fixed perpendicular guide-board, C, rising from the back edge of said bed. The guide-board B is movable up to and from a knife, D, and this board is rigidly secured to a long dovetail slide, $a$, which is longitudinally movable in a dovetail groove in the bed A. The knife D is provided with a handle, $d$, and pivoted to the upper ends of two vibrating arms, $c$ E, which are pivoted at their lower ends to two extensions, $b\ e$, secured to the bed A. The knife thus arranged is allowed to receive vertical vibration, and it is guided by passing through a vertical slot, $s$, made through the board C.

From the above description it will be seen that the two boards B C afford two supports for a loaf of bread placed upon the bed A, and that the board B is movable with the loaf while the latter is sliced by the knife D.

It will be seen, reference being had to the drawings, that the arms $c$ E are of equal length, and as they are pivoted to the said knife and to the extensions $b\ e$ of the case or platform, the knife will descend when actuated to cut bread in a horizontal plane.

The advantage of this construction is that the bread is cut through at one stroke of the knife, its edge never coming in contact with the front or rear edges of the board or base, which would necessitate one or more strokes of the knife, but cutting directly through from the upper crust to the lower crust, every position of the knife being parallel with that which it had at the commencement of the stroke.

I am well aware that it is not new in bread-slicers to guide a knife in slots, nor to render it movable vertically by pivoting it at one end to a slotted standard, as is shown in Letters Patent No. 31,789, of March 26, 1861; hence I do not make a broad claim to these devices.

What I claim as new, and desire to secure by Letters Patent, is—

The parallel moving knife D, in combination with the pivoted arms E $c$, slotted projections $b\ e$, base-board A, and slotted side board C, substantially as described, and for the purpose set forth.

In testimony that I claim the above I have hereunto subscribed my name in the presence of two witnesses.

BRADFORD W. STOREY.

Witnesses:
 J. F. LAUMASTER,
 JOS. H. WILLS.